United States Patent
Wang et al.

(10) Patent No.: US 10,690,834 B2
(45) Date of Patent: Jun. 23, 2020

(54) BACKLIGHT DEVICE AND MANUFACTURING METHOD THEREOF

(71) Applicants: Beijing BOE Display Technology Co., Ltd., Beijing (CN); BOE Technology Group Co., Ltd., Beijing (CN)

(72) Inventors: Huijuan Wang, Beijing (CN); Yunyun Tian, Beijing (CN); Zezhou Yang, Beijing (CN); Yonglian Qi, Beijing (CN); Dejiang Zhao, Beijing (CN); Minqi Chen, Beijing (CN); Tao Liu, Beijing (CN); Shi Shu, Beijing (CN)

(73) Assignees: BEIJING BOE DISPLAY TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/144,188

(22) Filed: Sep. 27, 2018

(65) Prior Publication Data
US 2019/0101690 A1 Apr. 4, 2019

(30) Foreign Application Priority Data
Sep. 29, 2017 (CN) .......................... 2017 1 0909000

(51) Int. Cl.
*G02B 6/00* (2006.01)
*F21V 8/00* (2006.01)

(52) U.S. Cl.
CPC ......... *G02B 6/0055* (2013.01); *G02B 6/0003* (2013.01); *G02B 6/0038* (2013.01); *G02B 6/0065* (2013.01); *G02B 6/0073* (2013.01); *G02B 6/0088* (2013.01)

(58) Field of Classification Search
CPC .. G02B 6/0055; G02B 6/0065; G02B 6/0075; G02B 6/0073; G02B 6/0038; G02B 6/0003
See application file for complete search history.

(56) References Cited

U.S. PATENT DOCUMENTS

| | | | |
|---|---|---|---|
| 9,645,304 B2* | 5/2017 | Nichol | G02B 6/0028 |
| 10,422,942 B2* | 9/2019 | Peeters | F21V 9/30 |
| 2012/0113672 A1* | 5/2012 | Dubrow | G02B 6/0068 362/602 |
| 2016/0139328 A1* | 5/2016 | Hikmet | G02B 6/0035 362/84 |
| 2016/0266297 A1* | 9/2016 | Hikmet | G02B 26/008 |
| 2017/0139113 A1* | 5/2017 | Peeters | F21S 41/24 |

* cited by examiner

*Primary Examiner* — Anabel Ton
(74) *Attorney, Agent, or Firm* — Myers Bigel, P.A.

(57) ABSTRACT

The present disclosure relates to the field of display technologies, and especially discloses a backlight device and a method for manufacturing the same. The backlight device includes a backlight source, a light guide plate, a reflective layer, an optical adhesive layer and an outcoupling structure. Specifically, in the backlight device, the reflective layer and the light guide plate are located on opposite sides of the backlight source respectively.

15 Claims, 4 Drawing Sheets

BACKLIGHT DEVICE AND MANUFACTURING METHOD THEREOF

CROSS REFERENCE TO RELATED APPLICATION(S)

The present application claims the priority of the Chinese patent application No. 201710909000.7 filed on Sep. 29, 2017, the entire disclosure of which is incorporated herein by reference.

TECHNICAL FIELD

The present disclosure relates to the field of display technologies, and specifically discloses a backlight device and a method for manufacturing the same.

BACKGROUND ART

In the field of display, particularly the field of liquid crystal display, backlight devices are one of the most important components for providing backlight such that normal display is achieved. As an example, direct-lit backlight devices have attracted more and more attention by virtue of local-dimming of backlight and display contrast increased thereby.

Typically, in a direct-lit backlight device, a plurality of light sources is usually provided in an array below the entire backlight device, and furthermore, several diffusion plates, diffusion prisms and so on are also provided to achieve uniform backlight illumination. However, due to the stacking of multiple layers and for the purpose of achieving uniform distribution of backlight, the light sources usually need to be provided such that they are separated from each layer above them.

Besides, in a conventional backlight device using a light-emitting diode (LED) light source, it is often difficult to provide backlight of a high color gamut since light emitted from the LED light source has very limited colors. Although it has been reported that backlight of a high color gamut can be obtained by using light emitting quantum dot materials, the existing backlight devices containing the light emitting quantum dot materials often involve very complicated manufacture processes, thus leading to high manufacture costs.

SUMMARY

According to one aspect of the present disclosure, a backlight device is provided. Specifically, the backlight device comprises: a backlight source, a light guide plate, a reflective layer, an optical adhesive layer and an outcoupling structure. Besides, in the backlight device, the reflective layer and the light guide plate are located on opposite sides of the backlight source respectively. In particular, the light guide plate is located on a light exit side of the backlight source. Similarly, the optical adhesive layer and the outcoupling structure are located on a surface of the light guide plate facing towards the backlight source and a surface of the light guide plate facing away from the backlight source respectively. Moreover, in the backlight device as provided by an embodiment of the present disclosure, the optical adhesive layer further comprises a plurality of grooves in an array, wherein light emitting quantum dot material is provided within each groove. The light emitting quantum dot material is configured to receive light from the backlight source and at least partially convert it into light of a different wavelength. Furthermore, the outcoupling structure further comprises a plurality of sub-outcoupling structures in an array and is configured to allow light to be coupled out from the light guide plate.

According to an embodiment of the present disclosure, the optical adhesive layer is located on a surface of the light guide plate facing away from the backlight source, and meanwhile, the outcoupling structure is located on a surface of the light guide plate facing towards the backlight source. Alternatively, according to a further embodiment, in the backlight device as provided by embodiments of the present disclosure, the optical adhesive layer is located on a surface of the light guide plate facing towards the backlight source, and meanwhile, the outcoupling structure is located on a surface of the light guide plate facing away from the backlight source. As can be seen, in the backlight device as proposed above, the optical adhesive layer and the outcoupling structure are formed on opposite sides of the light guide plate respectively, and either of the above arrangements can be used upon actual needs.

According to an embodiment of the present disclosure, in the above backlight device, optionally, a reflective metal layer is further provided within each groove, wherein the reflective metal layer is closer to the light exit side of the backlight device than the light emitting quantum dot material.

According to a specific embodiment of the above backlight device, in each groove of the optical adhesive layer, the light emitting quantum dot material is in direct contact with circumferential walls of grooves. Alternatively, in a further embodiment, an air gap exists between the light emitting quantum dot material in each groove and the circumferential wall of this groove. As an example, when an air gap is formed between the light emitting quantum dot material and the circumferential wall of a groove, light from the light emitting quantum dot material will be coupled to a surrounding optical adhesive material and moreover to the light guide plate via the air gap at a higher coupling efficiency. This will improve the efficient utilization of the secondary light emitted from the light emitting quantum dot material in the entire device.

As an optional example, in the backlight device as provided by embodiments of the present disclosure, the outcoupling structure comprises protrusions or recesses formed on the light guide plate. Obviously, those skilled in the art should understand that the form of protrusions or recesses as given above is only used to illustrate a specific example of the outcoupling structure, and the present disclosure should not be limited thereto at all. In fact, as explained above, in embodiments of the present disclosure, any suitable outcoupling structure can be adopted, as long as it can destroy total internal reflection of light within the light guide plate, thereby allowing the light to be outputted from the light guide plate.

Also optionally, according to other embodiments of the present disclosure, in the backlight device, the quantum dot material is further mixed with one or more of a matrix material, a ligand material and scattering particles. As an example, the matrix material comprises polyester imide (PEI), ammonium persulfate (APS) and so on; the ligand material comprises epoxy resin and so on; and the scattering particles comprise silicon dioxide ($SiO_2$) particles and so on. All these materials can help to protect the light emitting quantum dot material against influences of high temperature, high intensity light, external gases, moisture and other harmful environmental factors. Thus, efficiency and quality of the secondary light emitted from the light emitting quantum dot material are ensured. Those skilled in the art should understand that the materials as listed herein are only exemplary representative materials, and should never be construed as limiting the present disclosure. In fact, benefiting from teachings of the present disclosure, those skilled in the art can choose any suitable matrix material, ligand material, scattering particles, etc., upon actual needs.

Optionally, according to a further example, in the backlight device as provided by embodiments of the present disclosure, the light source comprises an array of light emitting diodes (LEDs) formed on a base substrate. In this case, the reflective layer is arranged on a surface of the base substrate opposite to the array of light emitting diodes (LEDs). Obviously, those skilled in the art should be clear that the specific manner for forming a backlight source by an LED array herein is only used to illustrate the principle of the present disclosure, and should not be construed as limiting the present disclosure in any possible way. Benefiting from teachings of the present disclosure, those skilled in the art can choose upon actual needs any backlight source with a suitable structure, and the present disclosure should cover all possible alternatives. That is to say, the term "backlight source" mentioned herein refers to any light sources with a suitable structure that are capable of providing a backlight for a display product.

According to another aspect of the present disclosure, a method for manufacturing a backlight device is provided. Specifically, the manufacturing method comprises steps of: providing a backlight source; providing a light guide plate on a light exit side of the backlight source; forming a reflective layer on a side of the backlight source opposite to the light guide plate; forming an optical adhesive layer on a surface of the light guide plate facing towards the backlight source or on a surface of the light guide plate facing away from the backlight source; and forming an outcoupling structure on a surface of the light guide plate opposite to the optical adhesive layer. Moreover, in the method for manufacturing a backlight device as provided by an embodiment of the present disclosure, the optical adhesive layer is further formed to comprise a plurality of grooves in an array, wherein a light emitting quantum dot material is provided within each groove. The light emitting quantum dot material is configured to receive light from the backlight source and at least partially convert it into light of a different wavelength. Besides, in an embodiment, the outcoupling structure as formed in the above step further comprises a plurality of sub-outcoupling structures in an array and is configured to allow light to be coupled out from the light guide plate.

According to a specific embodiment, in the method for manufacturing a backlight device as described above, the step of forming an optical adhesive layer comprises: coating an optical adhesive film on a surface of the light guide plate facing towards the backlight source or on a surface of the light guide plate facing away from the backlight source; etching the optical adhesive film to form a plurality of grooves in an array; and providing a light emitting quantum dot material within each groove. Alternatively, according to an optional embodiment, in the above manufacturing method, the step of forming an optical adhesive layer comprises: forming a plurality of groove circumferential walls (particularly by a light emitting quantum dot material) on a surface of the light guide plate facing towards the backlight source or on a surface of the light guide plate facing away from the backlight source, wherein each groove circumferential wall encloses a groove; providing a light emitting quantum dot material within each groove; and completely covering the plurality of grooves and areas between adjacent grooves by using an optical adhesive material. Apparently, the procedure of forming an optical adhesive layer listed above as an example is only used for schematically illustrating the principle of the present disclosure, and should never be construed as limiting the present disclosure in any possible way. In fact, benefiting from teachings of the present disclosure, those skilled in the art can form the optical adhesive layer as discussed above by any suitable process upon actual needs, and the present disclosure should not be limited in this aspect.

In a further embodiment, the above method for manufacturing a backlight device further comprises: forming a reflective metal layer within each groove such that the reflective metal layer is closer to the light exit side of the backlight device than the light emitting quantum dot material. Specifically, as an example, the reflective metal layer can be formed before or after the formation of the light emitting quantum dot material, and the present disclosure should not be limited in this aspect. For example, an optical adhesive film is coated on a surface of the light guide plate facing towards the backlight source and then etched to form a plurality of grooves. After that, the reflective metal layer can be formed first within the plurality of grooves, which are then filled with the light emitting quantum dot material as described above. This means that the reflective metal layer is formed on the bottom of the grooves, and the light emitting quantum dot material covers the reflective metal layer. Alternatively, if the optical adhesive layer is formed on a surface of the light guide plate facing away from the backlight source, i.e., closer to the light exit side of the entire backlight device, the reflective metal layer can be formed after the light emitting quantum dot material. In other words, the plurality of grooves in the optical adhesive layer are first filled with a light emitting quantum dot material, and then a reflective metal layer overlaying the light emitting quantum dot material is formed.

Optionally, according to other embodiments of the present disclosure, in the method for manufacturing a backlight device as described above, the light emitting quantum dot material is provided within each groove in two different ways. Specifically, as an example, the light emitting quantum dot material is provided within each groove in such a way that the light emitting quantum dot material is in direct contact with circumferential walls of the grooves. Alternatively, as a further example, the light emitting quantum dot material is provided within each groove in such a way that an air gap is formed between the light emitting quantum dot material and circumferential walls of the grooves.

BRIEF DESCRIPTION OF DRAWINGS

The above and other features and advantages of the present disclosure will become clear from the specific embodiments as described below in combination with the drawings, and will be illustrated in detail with reference to the specific embodiments.

DETAILED DESCRIPTION OF EMBODIMENTS

The backlight device as provided in embodiments of the present disclosure and the manufacturing method thereof will be described in detail with reference to the drawings. It should be pointed out that the drawings are necessarily drawn to scale. On the contrary, we will generally focus on principles of the present disclosure. Therefore, dimensions, positions or the like of various components and elements shown in the drawings do not represent true dimensions, positions or the like. Instead, they are only provided for facilitating complete understanding of principles of the present disclosure.

Figure 1:
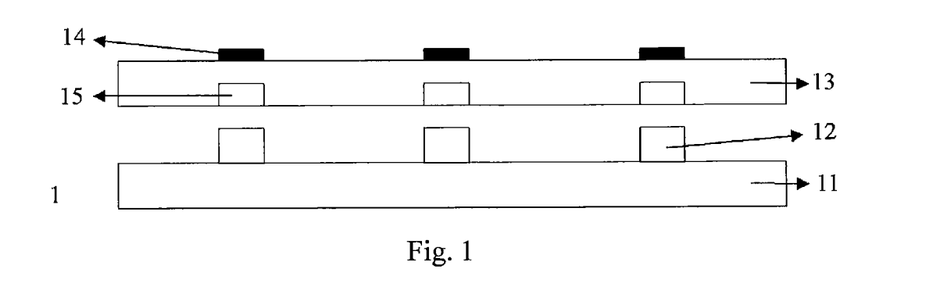
FIG. 1 schematically shows a section view of a typical backlight device comprising a light emitting quantum dot material.

Referring to FIG. 1, a schematic section view of a typical backlight device comprising a light emitting quantum dot material is shown. Specifically, the backlight device 1 comprises a reflective plate 11, an LED light source 12 located on the reflective plate 11, as well as a light guide plate 13 overlaying above the LED light source 12 and the reflective plate 11. Furthermore, in the backlight device 1, an array of light emitting quantum dot materials 15 is embedded into the light guide plate 13, and an outcoupling structure 14 is further formed on a light exit side of the light guide plate (i.e., an upper side as shown in FIG. 1), so as to destroy total internal reflection of light within the light guide plate such that the light can be coupled out from the light guide plate. In this case, the light emitted from the light source 12 can be absorbed by the light emitting quantum dot material 15, and then at least partially converted into secondary light of a different wavelength via the light emitting quantum dot material 15. The secondary light emitted from the light emitting quantum dot material 15 is transmitted to a remote end within the light guide plate 13 by total internal reflection, and coupled out from the light guide plate 13 when passing through the outcoupling structure 14. In other words, the outcoupling structure 14 destroys total internal reflection of light within the light guide plate 13, such that at least part of the light can be coupled out from the light guide plate 13.

As can be seen, in the backlight device 1 as provided by embodiments of the present disclosure, on one hand, backlight illumination of a high color gamut is achieved by means of secondary light emission of the light emitting quantum dots; and meanwhile on the other hand, the light emitting quantum dot material 14 is provided separately in a further optical adhesive layer, which helps to reduce the manufacture processes and obtain a thinner backlight device.

In the backlight device 1 as shown by FIG. 1, the light emitting quantum dot material 15 is directly embedded into the light guide plate 13. Therefore, in terms of manufacture process, it is necessary to drill holes in the light guide plate 13 (which is usually made of a glass material) so as to embed the light emitting quantum dot material 15 into the light guide plate 13. Conventionally, drilling in glass can be achieved by means of a laser drilling process and a wet etching drilling process. However, when the light guide plate has a large size and a great number of holes are needed, the laser drilling process will become inefficient and lead to a high process cost. Besides, it is difficult for the laser drilling process to accurately control the section morphology of the holes. Similarly, the wet etching process usually requires a matched photosensitive glass. Typically, after wet etching, light transmittance of the photosensitive glass is often reduced prominently, e.g., from 90% to 70%-80%, which can easily cause color shift problems. Moreover, both laser drilling and wet etching drilling have a certain limitation of diameters and depths of the holes, which is quite unfavorable to the production of backlight devices of a high performance.

Figure 2:
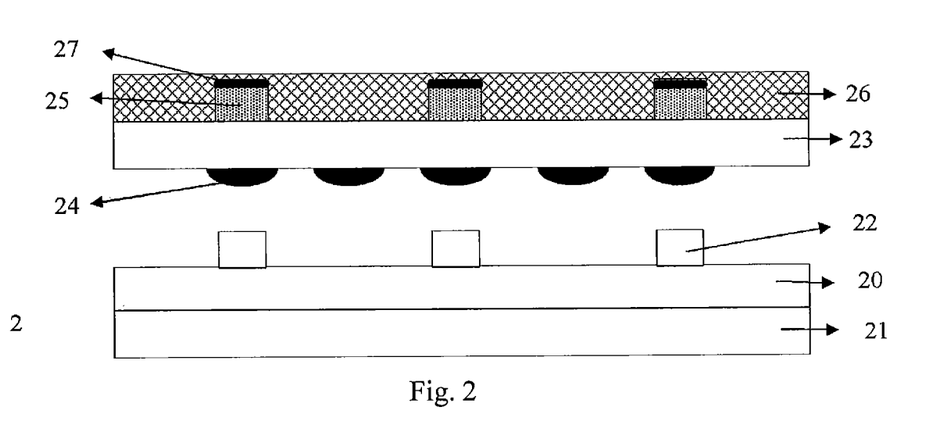
FIG. 2 schematically shows a section view of a backlight device according to an embodiment of the present disclosure.

In light of the above discussion, according to one aspect of the present disclosure, a novel backlight device containing a light emitting quantum dot material is provided. Referring to FIG. 2, a section view of a backlight device according to an embodiment of the present disclosure is schematically shown. Specifically, the backlight device 2 can comprise: a base substrate 20, a reflective layer 21, an LED backlight source 22, a light guide plate 23, an outcoupling structure 24 and an optical adhesive layer 26. As shown in the lower part of FIG. 2, in the backlight device 2, the reflective layer 21 is arranged on a lower side of the base substrate 20, and meanwhile the LED backlight source 22 is arranged on an upper side of the base substrate 20. Besides, the light guide plate 23 is disposed on a light exit side (i.e., an upper side) of the backlight source 22, and arranged opposite to the base substrate 20 and in turn the reflective layer 21. Similarly, as can be seen from the upper part of FIG. 2, in the backlight device 2, the optical adhesive layer 26 and the outcoupling structure 24 are respectively formed on a surface of the light guide plate 23 facing away from the backlight source 22 (i.e., an upper surface) and on a surface of the light guide plate 23 facing towards the backlight source 22 (i.e., a lower surface). It should be understood that the reflective layer 21 located below the base substrate 20 can recycle the light propagating downwards (whether it is light directly emitted from the backlight source 22 or secondary light emitted from a light emitting quantum dot material 25), thereby achieving effective utilization of light. As an example, the reflective layer 21 can be formed by a single reflective film, such as an Ag or Al reflective layer. Alternatively, the reflective layer 21 can also be a Bragg reflector stack, and the present disclosure is not limited thereto.

Moreover, as shown in FIG. 2, in the backlight device 2, the optical adhesive layer 26 can further comprise a plurality of grooves in an array, wherein a light emitting quantum dot material 25 is provided within each groove. Furthermore, the outcoupling structure 22 can comprise a plurality of sub-outcoupling structures in an array (in particular, a plurality of protrusion structures as shown in FIG. 2) and is configured to allow light to be coupled out from the light guide plate 23. This means that the outcoupling structure destroys total internal reflection of light within the light guide plate 23 such that at least part of the light can be coupled out from the light guide plate 23. Specifically, light emitted from the LED backlight source 22 will first enter the light guide plate 23 and propagate towards a remote end within the light guide plate by total internal reflection. When the light propagating within the light guide plate by total internal reflection meets the outcoupling structure 24, conditions for total internal reflection are no longer satisfied due to the presence of outcoupling structure 24. Therefore, light will be coupled out from the light guide plate 23, and furthermore possibly, received by the light emitting quantum dot material

25. The light emitting quantum dot material 25 absorbs light from the backlight source 22 and at least partially converts it into secondary light of different colors. The secondary light from the light emitting quantum dot material 25 can be directly outputted into an external environment via the optical adhesive layer 26. Obviously, the secondary light can also return to the light guide plate 23 first, and then propagate within the light guide plate (potentially by total internal reflection) for a period of time before it is coupled out via the outcoupling structure 24.

It should be pointed out that the LED backlight source 22 as provided here is only used as a representative example, e.g., a blue light LED, and a backlight source 22 of any suitable type can be chosen upon needs. Meanwhile, the light emitting quantum dot material 25 can be chosen flexibly when the backlight source 22 is given, and the present disclosure should not be limited in this aspect in any possible way. As an example, when the LED backlight source 22 is a blue light LED, the light emitting quantum dot material 25 can be chosen as comprising both red (R) and green (G) light emitting quantum dots. Similarly, if the LED backlight source 22 is KSF fluorescent powder plus a blue light LED structure, the light emitting quantum dot material 25 can comprise only green (G) light emitting quantum dots. Of course, those skilled in the art should understand that the above specific materials are only representative examples, and should never be construed as limiting the present disclosure in any possible way.

Optionally, according to an embodiment of the present disclosure, in order to prevent the secondary light emitted from the light emitting quantum dot material 25 directly entering the external environment from top, in the backlight device 2, a metal reflective layer 27, especially an Ag layer or Al layer, can be further provided in the grooves of the optical adhesive layer 26. As shown in FIG. 2, the metal reflective layer 27 is closer to the light exit side, i.e., the upper side, of the backlight source 2 than the light emitting quantum dot material 25. In this way, the secondary light emitted from the light emitting quantum dot material 25 and directly projected upwards will be reflected by the metal reflective layer 27, and hence cannot enter the external environment directly in a perpendicular manner. By means of such a reflective metal layer 27, in particular by arranging it close to the light exit side of the backlight device 2, a direct projection of the secondary light emission from the light emitting quantum dot material 15 out of the backlight device 2 can be effectively avoided. In this way, the uniformity of light emission from the entire backlight device 2 on the light exit surface (i.e., the upper surface) can be improved notably.

The backlight device according to another embodiment of the present disclosure will be further illustrated with reference to FIG. 3, in which a schematic section view of the backlight device is shown. Specifically, similar to the case of FIG. 2, in FIG. 3, the backlight device 3 can comprise: a base substrate 30, a reflective layer 31, an LED backlight source 32, a light guide plate 33, an outcoupling structure 34 and an optical adhesive layer 36. Likewise, there is also a plurality of grooves in the optical adhesive layer 36, wherein each groove is filled with a light emitting quantum dot material 35. However, apparently, in FIG. 3, the outcoupling structure 34 and the optical adhesive layer 36 are arranged on an upper side and a lower side of the light guide plate 33 respectively, which is contradictory to the case of FIG. 2, where the outcoupling structure 24 and the optical adhesive layer 26 are arranged on a lower side and an upper side of the light guide plate 23 respectively.

In this case, light emitted from the LED backlight source 32 will first enter the optical adhesive layer 36 and in turn the light emitting quantum dot material 35, and then enter the light guide plate 33. Likewise, similar to the case of FIG. 2, light arriving at the light emitting quantum dot material 35 will be absorbed by the light emitting quantum dot material 35 and at least partially converted into further secondary light of a different wavelength. The secondary light and the light (emitted from the LED backlight source 32) not passing through the light emitting quantum dot material 35 (i.e., directly passing through the optical adhesive layer 36), will enter the light guide plate 33 together and propagate towards a remote end within the light guide plate by total internal reflection. Furthermore, when light passes through the outcoupling structure 34, conditions for the total internal reflection will no longer be satisfied. So, light will be coupled out from the light guide plate 33. Similar to the case of FIG. 2, in FIG. 3, a metal reflective layer 37 can be optionally arranged within each groove of the light emitting quantum dot material 35, wherein the metal reflective layer 37 is closer to the light exit side (i.e., the upper side in FIG. 3) of the entire backlight device 3 than the light emitting quantum dot material 35. In this way, the secondary light emitted from the light emitting quantum dot material 35 and directly projected upwards will be reflected by the metal reflective layer 37, and hence cannot enter the external environment perpendicularly. Thereby, light output uniformity of the entire backlight device 3 is improved.

Figure 3:
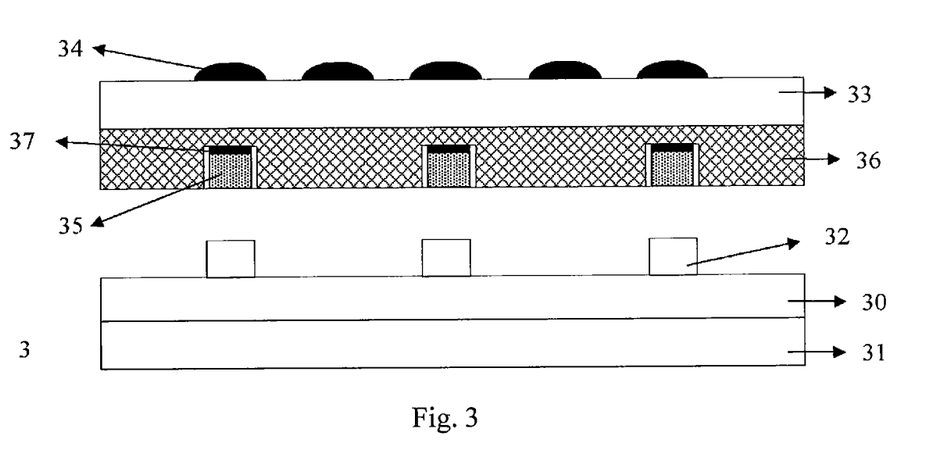
FIG. 3 schematically shows a section view of a backlight device according to another embodiment of the present disclosure.

Optionally, according to the embodiment as shown in FIG. 3, in each groove of the optical adhesive layer 36, an air gap is further provided between the light emitting quantum dot material 35 and a circumferential wall of the groove. This can be seen evidently from a blank gap between them in FIG. 3 and is obviously different from the case of FIG. 2. By means of the air gap and the edge-lit backlight theory, light emitted from the light emitting quantum dot material 35 will be transmitted into the light guide plate 33 at a very high coupling efficiency. Theoretically, the coupling efficiency can be as high as 100%. Specifically, the edge-lit backlight theory can be briefly summarized as follows: assuming that light is directly transmitted into the light guide plate 33 via the air gap, and the parameters are respectively: refractive index n1 of the air (i.e., n1=1), refractive index n2 of the light guide plate 33 (for a glass light guide plate, n2=1.5), incident angle θ1 and refraction angle θ2. According to the law of refraction, n1 sin θ1=n2 sin θ2, θ2=arc sin(n1 sin θ1/n2). As can be seen, when θ1 is maximum, i.e., θ1=90°, θ2 takes the maximum value of 41.8°, and the maximum refraction angle falls within the critical angle of total internal reflection of the light guide plate 33. This means that, theoretically, all incident light (i.e., the incident angle≤90°) from the light emitting quantum dot material 35 can be coupled into the light guide plate 33 via the air gap. For the part of light propagating into the optical adhesive layer 36 first and then entering the light guide plate 33, the coupling efficiency can be derived in a similar manner, which will not be repeated here.

Figure 4:
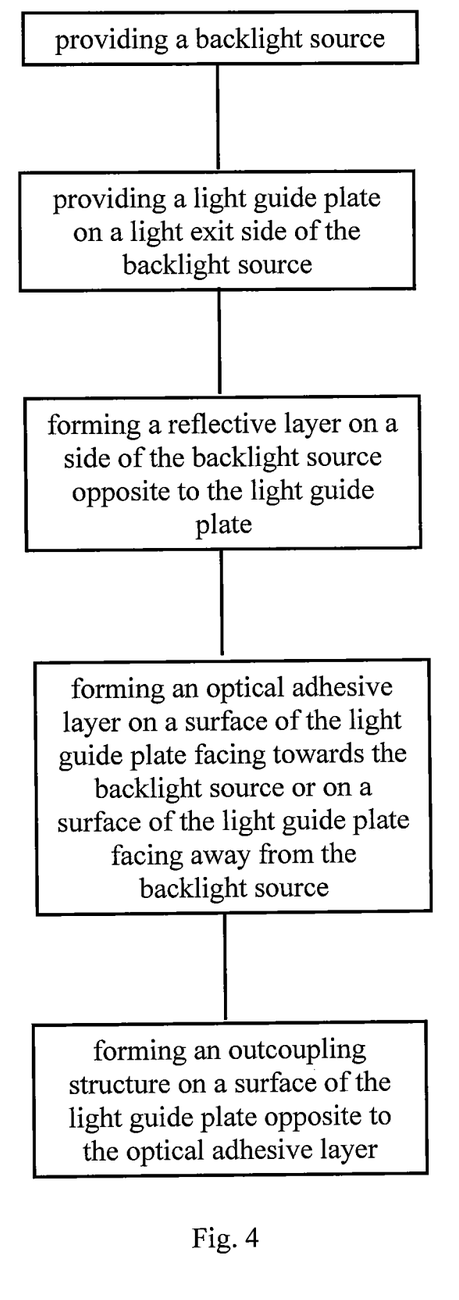
FIG. 4 schematically shows a flow chart of a method for manufacturing a backlight device according to an embodiment of the present disclosure.

According to another aspect of the present disclosure, a method for manufacturing a backlight device is further provided. Now returning to the corresponding device in FIGS. 2-3 and the flow chart of the manufacturing method in FIG. 4, the method provided by embodiments of the present disclosure will be introduced briefly.

Specifically, the manufacturing method mainly comprises steps of: providing a backlight source 22, 32; providing a light guide plate 23, 33 on a light exit side (i.e., an upper side in FIGS. 2-3) of the backlight source 22, 32; providing a reflective layer 21, 31 on a lower side of the backlight source 22, 32, i.e., a side opposite to the light guide plate 23, 33; as well as forming an optical adhesive layer 26, 36 and an outcoupling structure 24, 34 respectively on an upper side and a lower side of the light guide plate 23, 33.

As can be seen, the method for manufacturing a backlight source as provided by embodiments of the present disclosure only adopts simple processing techniques, such as deposition, etching, filling or the like, and does not involve any complicated treatment of the light guide plate, such as drilling. This prominently reduces the production cost and notably improves the product quality. In addition, the backlight device as provided according to such a manufacturing method has a smaller total thickness, which facilitates the production of backlight devices of ultra-thin thickness and high color gamut.

The specific manufacturing procedure will be discussed in detail in combination with the backlight device 2 of FIG. 2 and the section view of a device in different stages of the manufacturing method of FIG. 5. For the manufacture of the backlight source, an LED die can be first formed on a base substrate 20 by transferring, and then a reflective layer 21 can be further formed on the back of the base substrate 20 (i.e., opposite to the LED die) by sputtering for example. As an example, the LED die can have an upright structure, a flip-chip structure or the like. The specific transferring manner can be chosen upon actual chip structure and process requirements. For example, it can be picking-up, global bonding or local bonding, or the like. As an advantageous option, if a blue light LED array is adopted, the latter transferring manner will be helpful in obtaining higher transfer efficiency as well as lower process difficulty and manufacture cost.

Figure 5:
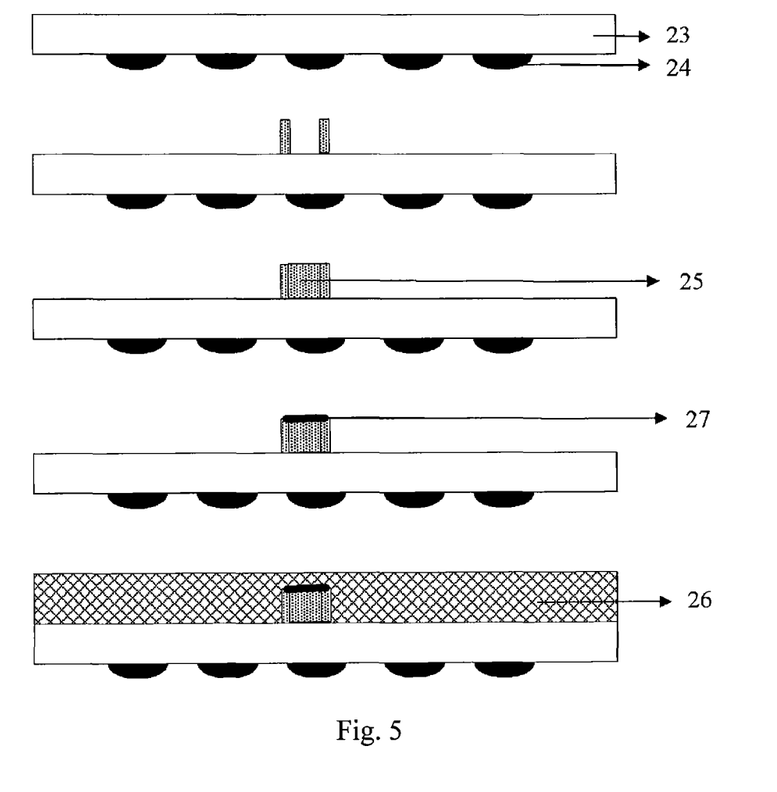
FIG. 5 schematically shows a section view of a backlight device in different manufacture stages according to an embodiment of the present disclosure.

Furthermore, referring to FIG. 5, after the manufacture of the base substrate 20 as well as the LED backlight source 22 and the reflective layer 21 located on respective sides of the base substrate, a light guide plate 23 can be continuously provided, and then an outcoupling structure 24 (i.e., the protrusion as shown in FIG. 2) can be formed by etching on a side of the light guide plate 22 facing towards the backlight source 22. Next, on a side of the light guide plate 23 facing away from the backlight source 22, i.e., on a side opposite to the outcoupling structure 24, a plurality of groove circumferential walls (in particular, made of a light emitting quantum dot material) are formed by photolithography so as to enclose a plurality of corresponding grooves, and the grooves are filled with a light emitting quantum dot material 25. After that, optionally, a metal material is evaporated over the filled light emitting quantum dot material 25 to form a metal reflective layer 27. Finally, an optical adhesive material overlays above the entire layer structure, the light guide plate 23 and the grooves filled with the light emitting quantum dot material 25, so as to form a final optical adhesive layer 26. As an example, the groove, i.e., the light emitting quantum dot material 25, can have a height in a range of 1-100 μm. Of course, the specific height range is only a representative example, and the present disclosure can choose to use any other height of the light emitting quantum dot material 25 where appropriate. Besides, it should be pointed out that, in order to achieve a better optical effect, advantageously, the refractive indexes of the optical adhesive layer 26, the light emitting quantum dot material 25 and the light guide plate 23 should be as close to each other as possible.

Figure 6:
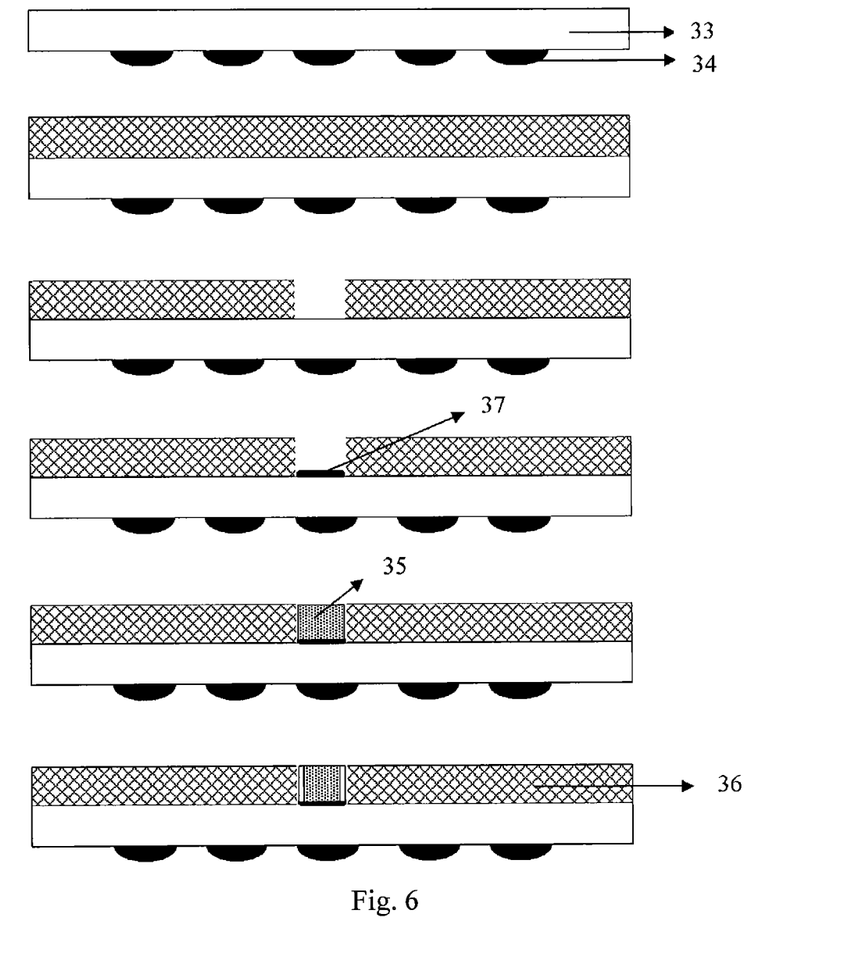
FIG. 6 schematically shows a section view of a backlight device in different manufacture stages according to another embodiment of the present disclosure.

In a similar way, the specific manufacturing procedure will be illustrated in detail in combination with the backlight device 3 of FIG. 3 and the section view of a device in different manufacturing stages of FIG. 6. For the formation of the backlight source 32 and the corresponding reflective layer 31, the specific manufacture steps in FIG. 2 can be referred to, which will not be repeated here. In contrast with the case of FIG. 2, in FIG. 3, there is an air gap between the light emitting quantum dot material 35 and the groove circumferential wall, which is mainly reflected by the following formation procedure. Referring to FIG. 6, firstly, a light guide plate 33 is provided, and an outcoupling structure 34 is formed by etching on a side of the light guide plate 33 facing away from the backlight source 32 (i.e., a lower side in FIG. 6). Next, an optical adhesive film is coated on a side of the light guide plate 33 facing towards the backlight source 32, i.e., on a side opposite to the outcoupling structure 34 (an upper side in FIG. 6). After that, the formed optical adhesive film is etched to form a plurality of corresponding grooves. Next, a metal material is evaporated in each groove formed thereby, so as to form a metal reflective layer 37 at the bottom of each groove, and then the grooves are filled with a light emitting quantum dot material 35. Finally, by other procedures such as a stripping process, or additional adjustment of process parameters such as heating duration, irradiation angle and irradiation duration of UV light, an air gap between the groove circumferential wall and the light emitting quantum dot material 35 is formed. Thus, a final optical adhesive layer 36 is obtained.

As pointed out above, when an air gap is formed between the light emitting quantum dot material and circumferential walls of the grooves, light from the light emitting quantum dot material will be coupled to a surrounding optical adhesive material via the air gap at a higher coupling efficiency. In this way, the secondary light emitted from the light emitting quantum dot material can be utilized more efficiently in the entire backlight device. According to an embodiment of the present disclosure, the air gap can be formed by adjusting parameters of conventional processing procedures. Obviously, the present disclosure is not limited thereto.

It should be pointed out that, in specific description of the present disclosure, terms indicative of orientational or positional relations such as "up", "down", "front", "back", "left", "right", "vertical", "horizontal", "top", "bottom", "internal" and "external" refer to orientational or positional relations based on the drawings. They are used only for simplifying the description of the present disclosure, instead of implying that the devices or elements involved therein must have a special orientation, or be constructed and operated in a specific orientation. Therefore, all such terms and other terms having equivalent meanings should not be construed as limiting the present disclosure.

It should be further pointed out that in the specific description of the present disclosure, terms such as "first" and "second" are only used for descriptive purposes and should not be construed as implying relative importance or hinting at the number of the indicated technical feature. Therefore, features defined by terms such as "first" and "second" may indicate explicitly or implicitly that one or more such features are comprised. In the description of the present disclosure, unless otherwise explained, "multiple" means two or more.

It should be further noted that in the description of the present disclosure, unless otherwise prescribed and defined, terms such as "mount", "link" and "connect" should be understood in a broad sense. For example, it can refer to fixed connection, detachable connection, or even integrated connection. Likewise, it can refer to direct linkage, indirect linkage via an intermediate media, or even linkage inside two elements. For a person having ordinary skills in the art, the specific meanings of the above terms in the present disclosure can be understood upon specific situations.

It should be further pointed out that, in the depiction of this description, specific features, structures, materials or characteristics can be combined in any suitable manner in any one or more embodiments or examples.

The above disclosure is only specific embodiments of the present disclosure, but the protection scope of the present disclosure is not limited thereto. Within the technical field disclosed in the present disclosure, any variation or substitution easily conceivable for a skilled person who is familiar with this technical field shall fall within the protection scope of the present disclosure. Therefore, the protection scope of the present disclosure shall be subject to the claims.

What is claimed is:

1. A backlight device, comprising:
    a backlight source;
    a light guide plate on a light exit side of the backlight source;
    a reflective layer on a side of the backlight source opposite the light guide plate;
    an optical adhesive layer on one of a first surface of the light guide plate facing the backlight source or a second surface of the light guide plate opposite to the first surface; and
    an outcoupling structure on an the first surface or the second surface of the light guide plate which is opposite to the optical adhesive layer,
    wherein the optical adhesive layer comprises a plurality of grooves in a first array and a light emitting quantum dot material within ones of the plurality of grooves,
    wherein the light emitting quantum dot material is configured to receive light from the backlight source and at least partially convert the light into a different wavelength light,
    wherein the outcoupling structure comprises a plurality of sub-outcoupling structures in a second array, and
    wherein the outcoupling structure is configured to couple out the light from the light guide plate.

2. The backlight device according to claim 1,
    wherein the optical adhesive layer is on the second surface of the light guide plate, and
    wherein the outcoupling structure is on the first surface of the light guide plate.

3. The backlight device according to claim 1,
    wherein the optical adhesive layer is on the first surface of the light guide plate, and
    wherein the outcoupling structure is on the second surface of the light guide plate.

4. The backlight device according to claim 1,
    wherein the optical adhesive layer further comprises a reflective metal layer within the ones of the plurality of grooves,
    wherein the reflective metal layer is closer to the light exit side of the backlight source than the light emitting quantum dot material.

5. The backlight device according to claim 1,
    wherein the light emitting quantum dot material is in direct contact with circumferential walls of respective ones of the plurality of grooves.

6. The backlight device according to claim 1, further comprising:
    an air gap between the light emitting quantum dot material and circumferential walls of respective ones of the plurality of grooves.

7. The backlight device according to claim 1,
    wherein the outcoupling structure further comprises protrusions or recesses formed on the light guide plate.

8. The backlight device according to claim 1,
    wherein the quantum dot material is mixed with one or more of a matrix material, a ligand material or scattering particles.

9. The backlight device according to claim 1,
    wherein the backlight source comprises an array of light emitting diodes (LEDs) formed on a base substrate, and
    wherein the reflective layer is on a surface of the base substrate opposite the array of light emitting diodes (LEDs).

10. A method for manufacturing a backlight device, comprising:
    providing a backlight source;
    providing a light guide plate on a light exit side of the backlight source;
    forming a reflective layer on a side of the backlight source opposite the light guide plate;
    forming an optical adhesive layer on one of a first surface of the light guide plate facing the backlight source or a second surface of the light guide plate opposite to the first surface, wherein the optical adhesive layer comprises a plurality of grooves in a first array, wherein a light emitting quantum dot material is provided within ones of the plurality of grooves, and wherein the light emitting quantum dot material is configured to receive light from the backlight source and at least partially convert the light into a different wavelength light; and
    forming an outcoupling structure on the first surface or the second surface of the light guide plate that is opposite the optical adhesive layer,
    wherein the outcoupling structure comprises a plurality of sub-outcoupling structures in a second array, and
    wherein the outcoupling structure is configured to couple out the light from the light guide plate.

11. The method according to claim 10, wherein forming the optical adhesive layer comprises:
    coating an optical adhesive film on the first surface of the light guide plate source or on the second surface of the light guide plate;
    etching the optical adhesive film to form the plurality of grooves in the first array; and
    providing the light emitting quantum dot material within the ones of the plurality of grooves.

12. The method according to claim 10, wherein forming the optical adhesive layer comprises:
    forming a plurality of groove circumferential walls on the first surface of the light guide plate or on the second surface of the light guide plate, wherein respective ones of the groove circumferential walls encloses a corresponding groove of the plurality of grooves;
    providing the light emitting quantum dot material within the ones of the plurality of grooves; and
    completely covering the plurality of grooves and areas between adjacent grooves of the plurality of grooves by an optical adhesive material.

13. The method according to claim 10, further comprising:
    forming a reflective metal layer within the ones of the plurality of grooves, wherein the reflective metal layer is closer to the light exit side of the backlight source than the light emitting quantum dot material.

14. The method according to claim 10,
    wherein the light emitting quantum dot material is in direct contact with circumferential walls of respective ones of the plurality of grooves.

15. The method according to claim 10,
wherein the light emitting quantum dot material is provided within respective ones of the plurality of grooves such that an air gap is formed between the light emitting quantum dot material and circumferential walls of the respective ones of the plurality of grooves.

\* \* \* \* \*